United States Patent [19]
Ohashi et al.

[11] Patent Number: 5,497,800
[45] Date of Patent: Mar. 12, 1996

[54] FUEL VAPOR PROCESSING DEVICE

[75] Inventors: Tamiyoshi Ohashi; Joji Kasugai; Yoshihiro Nagino, all of Aichi, Japan

[73] Assignee: Toyoda Gosei Co., Ltd., Nishikasugai, Japan

[21] Appl. No.: 320,653

[22] Filed: Oct. 11, 1994

[30] Foreign Application Priority Data

Nov. 5, 1993  [JP]  Japan .................. 5-301242

[51] Int. Cl.⁶ .................................................. F16K 24/00
[52] U.S. Cl. ..................... 137/110; 123/519; 137/587
[58] Field of Search ................................. 137/587, 588, 137/110; 123/519

[56] References Cited

U.S. PATENT DOCUMENTS

| | | | |
|---|---|---|---|
| 4,343,281 | 8/1982 | Uozumi et al. | 123/519 |
| 4,714,172 | 12/1987 | Morris | 137/351 |
| 4,894,072 | 1/1990 | Turner et al. | 123/519 |
| 5,117,797 | 6/1992 | Telep et al. | 123/519 |
| 5,318,069 | 6/1994 | Harris | 137/110 X |
| 5,327,934 | 7/1994 | Thompson | 137/588 |

*Primary Examiner*—Stephen M. Hepperle
*Attorney, Agent, or Firm*—Cushman, Darby & Cushman

[57] ABSTRACT

In a fuel vapor processing device for transferring fuel vapor from a fuel tank to a canister when fuel is fed into the fuel tank through a fuel fill pipe or when the pressure in the fuel tank is raised to a predetermined value, a pressure given through the fuel fill pipe is applied to one side of a first diaphragm valve body forming a first diaphragm valve while a pressure given through a fuel tank passageway is applied to the other side thereof, so that, when the pressure in the fuel tank passageway is increased while fuel is being supplied into the fuel tank, a first communicating hole is opened; and the atmospheric pressure is applied to one side of a second diaphragm valve body forming a second diaphragm valve while a pressure given through the fuel tank passageway is applied to the other side, so that when the pressure in the fuel tank becomes higher than the atmospheric pressure by a predetermined value a second communicating hole is opened. Thus, in both cases, the fuel vapor formed in the fuel tank is moved to the canister.

8 Claims, 8 Drawing Sheets

5,497,800

1

FUEL VAPOR PROCESSING DEVICE

The priority application, Japanese Patent Application No. Hei 5-301242, filed in Japan on Nov. 5, 1993, is hereby incorporated into the present specification by this reference.

BACKGROUND OF THE INVENTION

This invention relates to a fuel vapor processing device for a vehicle which recovers the fuel vapor produced in the fuel tank while fuel is being supplied into the tank of the vehicle.

A conventional fuel vapor processing device 200 of this type is, for example, shown in FIG. 11. A fuel tank T is connected to a fuel fill pipe T1 which is sealing closed with a fuel cap FC. A fuel branch pipe T2 is connected to the upper portion of the fuel fill pipe T1. A cut-off pipe T3 with a first fuel cut-off valve 220 is connected to the fuel tank T. A first diaphragm valve 230 is provided between the cut-off pipe T3 and the aforementioned fuel branch pipe T2. The cut-off pipe T3 is connected through the first diaphragm valve 230 and a canister-side pipe T4 to a canister (not shown).

The first fuel cut-off valve 220 comprises a valve body 222 and a coil spring 224. As fuel is fed into the fuel tank T, the fuel level FL in the fuel tank T rises, so that the valve body 222 is engaged with a seat 226 formed on the pipe T3, to prevent the flow of the fuel from the fuel tank T into the cut-off pipe T3.

The first diaphragm valve 230 comprises a first diaphragm valve body 232. The pressure of the fuel vapor in the fuel tank is applied to one side of the first diaphragm valve body 232 on the side of the cut-off pipe T3, and to the other side of the first diaphragm valve body 232 on the side of the fuel branching pipe T2. The first diaphragm valve body 232 is urged by a coil spring 233 in a direction to open the valve 230.

With the fuel cap FC removed, fuel is fed into the fuel tank through the fuel fill pipe T1. In this operation, the pressure in the fuel tank T is increased, and the internal pressure of the tank T is applied through the first fuel cut-off valve 220 to the one side of the first diaphragm valve body 232. On the other hand, the atmospheric pressure is applied to the other side of the first diaphragm valve body 232. Hence, the first diaphragm valve body 232 is opened. As a result, the fuel vapor produced in the fuel tank T flows through the first fuel cut-off valve 220, the cut-off pipe T3, the first diaphragm valve 230 and the canister-side pipe T4 to the canister (not shown), where it is recovered. Thus, the air, from which the fuel vapor has been recovered, is released to the outside.

A fuel vapor control unit 240 is provided between the fuel tank T and the canister, to allow the fuel vapor to flow between the fuel tank and the canister. The fuel vapor control unit 240 comprises a fuel vapor control pipe T5, a second fuel cut-off valve 250, and a two-way valve 270.

The second fuel cut-off valve 250 is provided to prevent the flow of the fuel from the fuel tank T to the canister when the surface of fuel in the fuel tank T is inclined, for instance, by lateral vibration of the vehicle. The second fuel cut-off valve 250 comprises a casing body 252 which accommodates a float valve body 254, and a coil spring 256 adapted to urge the float valve body 254. The float valve body 254 includes a closing protrusion 254a extended from the top. As the closing protrusion 254a is engaged with a seat 252a formed on the fuel vapor control pipe T5, to close a

2 through-hole 252b formed in the casing body 252 through which the casing body 252 is communicated with the fuel vapor control pipe T5.

As is apparent from the above description, the second fuel cut-off valve 250 thus constructed operates as follows: When the fuel tank T is inclined, and the fuel level FL is raised to move the float valve body 254 upwardly, the closing protrusion 254a is engaged with the seat 252a to close the through-hole 252b, so that the flow of fuel from the fuel tank T to the canister is prevented.

A check valve 260 is provided in the upper portion of the second fuel cut-off valve 250. The check valve 260 operates to release the internal pressure of the fuel tank T when it has become difficult for the float valve body 254 to disengage from the seat 252a.

The two-way valve 270 has a partition wall 286 which divides the inside of its casing body 272 into an upper valve chamber 284 and a lower valve chamber 283. The lower valve chamber 283 accommodates a check valve 290, and is sealingly covered with a lid 292. The upper valve chamber 284 accommodates a second diaphragm valve 300, and is also sealingly covered with a lid 302.

The second diaphragm valve 300 comprises a second diaphragm valve body 304. The internal pressure of the fuel tank T is applied through the fuel vapor control pipe T5 to one side of the second diaphragm valve body 304, while atmospheric pressure and the elastic force of a coil spring 305 are applied to the other side of the second diaphragm valve body 304. Hence, when the internal pressure of the fuel tank becomes higher than the atmospheric pressure by a predetermined value, the valve 300 is opened to release (move) the fuel vapor from the fuel tank T into the canister.

The check valve 290 has a check valve body 294. The canister-side pressure is applied to one side of the check valve body 294, and the elastic force of a coil spring 296 is applied to the other side of the check valve body 294. Hence, when the internal pressure of the fuel tank T decreases to a predetermined value or less, the difference in pressure between the fuel tank T and the canister is a predetermined value and the check valve body 294 opens against the elastic force of the coil spring 296, so that the fuel vapor is returned from the canister into the fuel tank.

As is apparent from the above description, in the fuel vapor processing device 200, the second diaphragm valve body 304 and the check valve 290 are suitably opened and closed, to move the fuel vapor between the fuel tank T and the canister, thereby maintaining the internal pressure of the fuel tank T in a predetermined range of pressures.

The conventional fuel vapor processing device thus constructed is still disadvantageous in the following point: That is, in the fuel vapor processing device, in order to move the fuel vapor to the canister when fuel is fed into the fuel tank, the cut-off pipe T3, the first fuel cut-off valve 220 and the first diaphragm valve 230 are provided in the piping system which is different from the piping system in which the fuel vapor control unit 240 is provided. This arrangement makes the fuel vapor processing device intricate in arrangement, increases the number of manufacturing steps, and requires a relatively large space for installation.

SUMMARY OF THE INVENTION

Accordingly, an object of the invention is to eliminate the above-described difficulties accompanying a conventional fuel vapor processing device.

More specifically, an object of the invention is to provide a fuel vapor processing device which is simple in construction and easy to install in a small space.

The foregoing object and other objects of the invention are achieved by the provision of a fuel vapor processing device for transferring fuel vapor from a fuel tank to a canister when a liquid-phase fuel is fed into the fuel tank through a fuel fill pipe or when the pressure in the fuel tank is raised to a predetermined value.

The device includes:
a fuel-tank-side pipe line connected to the fuel tank.
A canister-side pipe line is connected to the canister.
A first communicating hole is provided between the fuel-tank-side pipe line and the canister-side pipe line.
A first diaphragm valve includes a first valve body having one side to which a pressure given through the fuel fill pipe is applied, and the other side to which a pressure given through the fuel-tank-side pipe is applied.

The first valve body opens and closes the first communicating hole depending on the two pressures applied thereto.

A second communicating hole is provided between the fuel-tank-side pipe line and the canister-side pipe line.

A second diaphragm valve is provided including a second valve body having one side to which atmospheric pressure is applied, and the other side to which a pressure given through the fuel-tank-side pipe line is applied.

The second valve body opens and closes the second communicating hole depending on the atmospheric pressure applied to the one side of the second valve body and the pressure applied to the other side of the second valve body.

In the fuel vapor processing device of the invention, the pressure in the fuel fill pipe is applied to the one side of the first valve body of the first diaphragm valve, while the pressure in the fuel-tank-side pipe is applied to the other side of the valve body. Hence, as fluid-phase fuel is fed into the fuel tank through the fuel fill pipe, the pressure in the fuel-tank-side pipe is increased to open the first communicating hole. As a result, the fuel vapor in the fuel tank is moved through the fuel-tank-side pipe, the first communicating hole and the canister-side pipe to the canister.

On the other hand, atmospheric pressure is applied to the one side of the second valve body of the second diaphragm valve, while the pressure given through the fuel-tank-side pipe is applied to the other side of the second valve body. Hence, when the pressure in the fuel tank becomes higher than the atmospheric pressure by a predetermined value, the second communicating hole is opened. As a result, the fuel vapor in the fuel tank is moved through the fuel-tank-side pipe, the second communicating hole, and the canister-side pipe to the canister.

The first communicating hole, which is opened and closed by the first valve body of the first diaphragm valve, and the second communicating hole, which is opened and closed by the second valve body of the second diaphragm valve, are formed in one piping system including the fuel-tank-side pipe line and the canister-side pipe line. Hence, both in the case where fuel is being supplied into the fuel tank, and in the case where the pressure in the fuel tank becomes higher than the atmospheric pressure, as much as the predetermined value, the fuel vapor in the fuel tank is moved to the canister.

The nature, principle, and utility of the invention will be more clearly understood from the following detailed description of the invention when read in conjunction with the accompanying drawings.

DETAILED DESCRIPTION OF THE INVENTION

Figure 1:
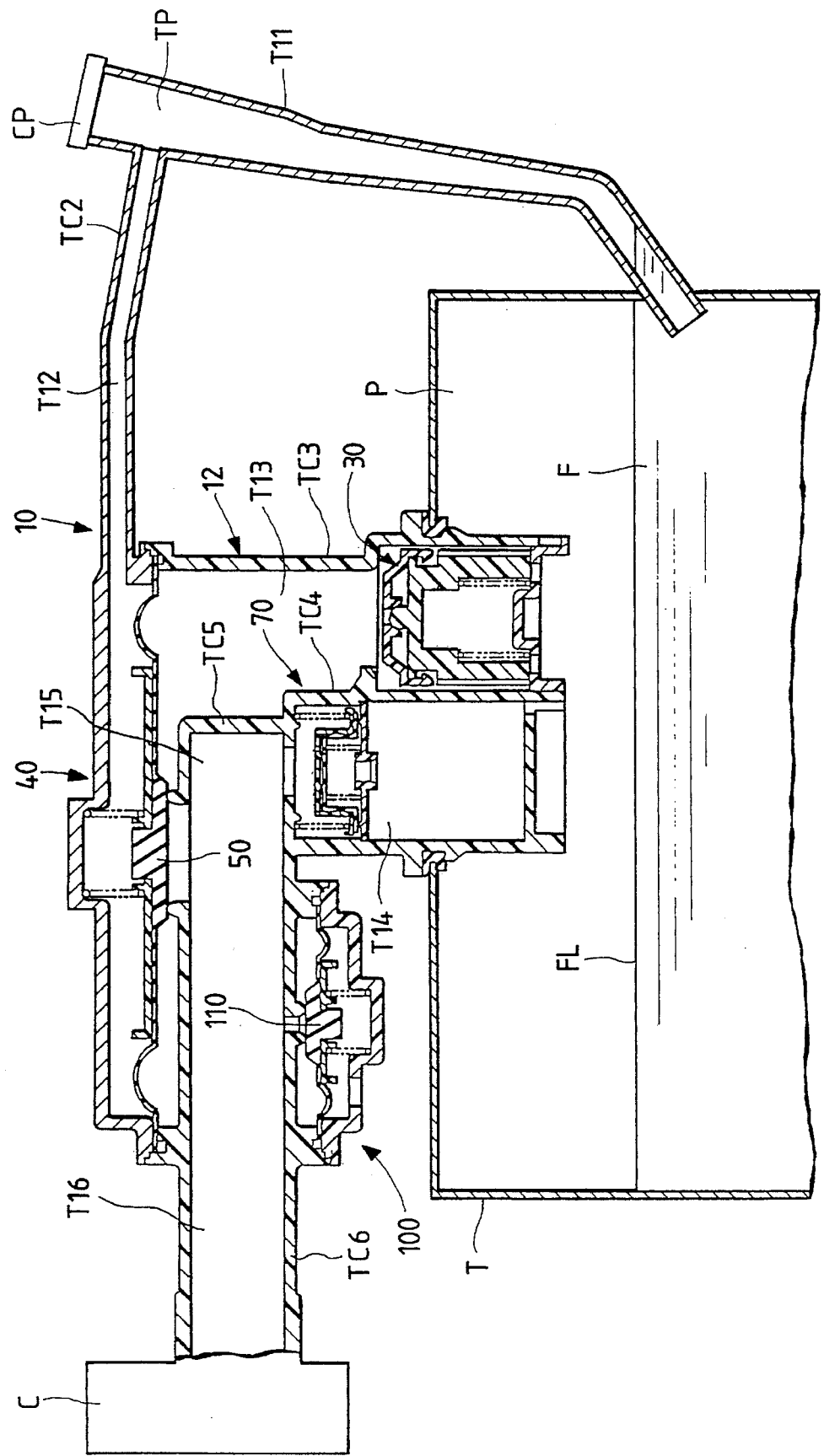
FIG. 1 is a diagram outlining the arrangement of a fuel vapor processing device, which constitutes one embodiment of the invention, mounted in a fuel tank of a vehicle.
Figure 2:
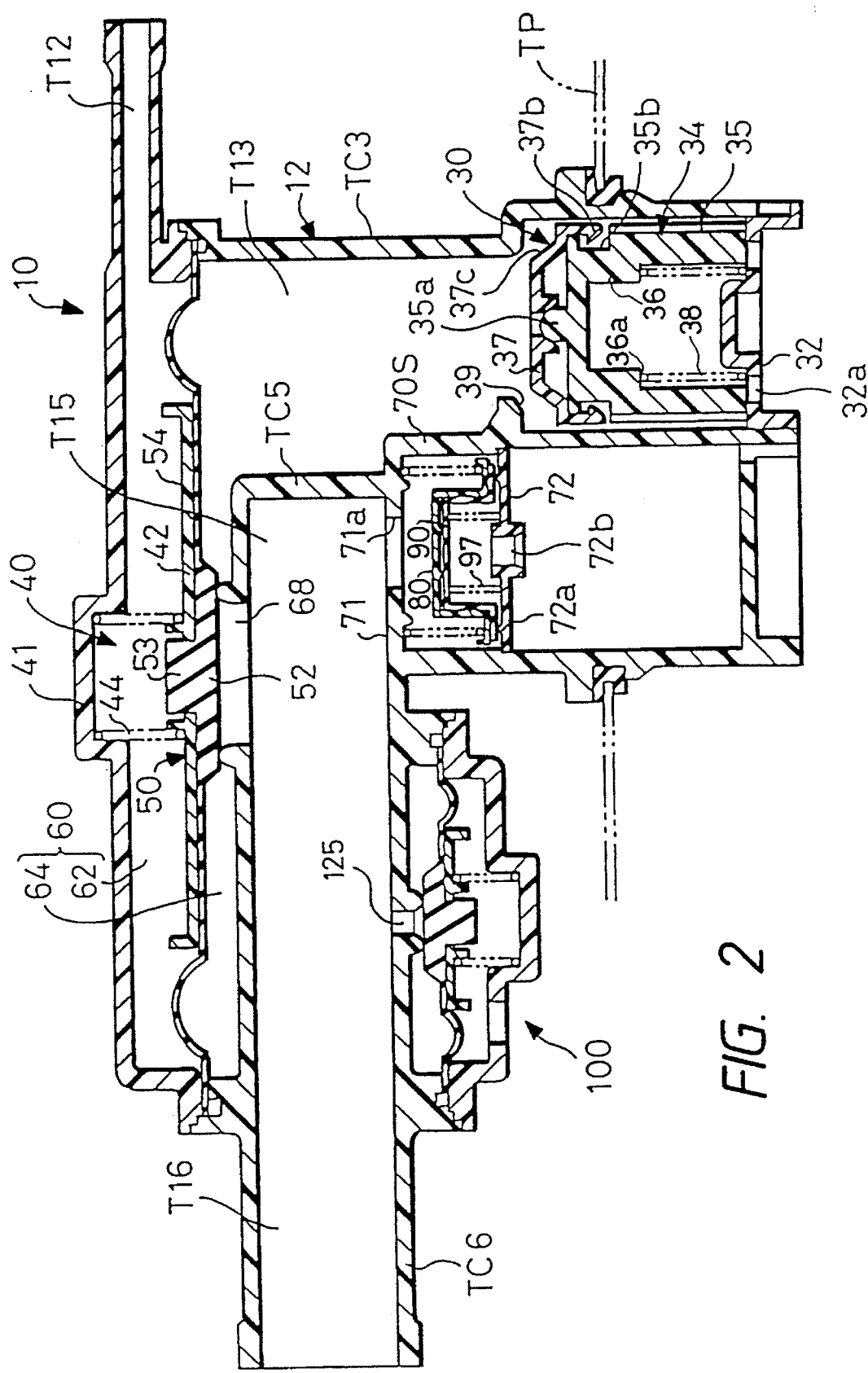
FIG. 2 is an enlarged sectional view of the fuel vapor processing device shown in FIG. 1.

A fuel vapor processing device, which constitutes one preferred embodiment of the invention, as shown in FIGS. 1 and 2, includes a pipe body 12, a fuel cut-off valve 30, a first diaphragm valve 40, a two-way valve 70, and a second diaphragm valve 100, which are all provided between a fuel tank T and a canister of a vehicle.

A fuel fill pipe T11 is connected to the fuel tank T1, and its opening TP is closed with a fuel cap CP. The pipe body 12 includes: a fuel fill branch pipe TC2 connected to the fuel fill pipe T11; a fuel tank pipe TC3; a two-way valve pipe TC4; a communicating pipe TC5; and a canister pipe TC6. These pipes TC2, TC3, TC4, TC5 and TC6 have a fuel fill branch passageway T12, a fuel tank passage way T13, a two-way passageway T14, a main communicating passageway T15, and a canister passageway T16, respectively.

The aforementioned fuel cut-off valve 30 is provided in the fuel tank passageway T13. The first diaphragm valve 40 and the second diaphragm valve 100 are provided between the main communicating passageway T15 connected to the fuel tank passageway T13, and the canister passageway T16. The two-way valve 70 is provided in the two-way passageway T14.

Now, the operation of the fuel vapor processing device 10 thus constructed will be outlined.

As fuel is fed through the fuel fill pipe T11 into the fuel tank T with the fuel cap CP removed, the internal pressure P of the fuel tank T is increased. The internal pressure P thus increased is applied through the fuel tank passageway TC13 and the fuel cut-off valve 30 to the first diaphragm valve 40 to open the latter 40, so that the fuel vapor is moved to the canister C. When the fuel tank T is filled with fuel; that is, when the fuel level FL in it is raised, the fuel cut-off valve 30 is closed, thus regulating the supply of liquid-phase fuel F to the canister C.

When the internal pressure P of the fuel tank T is increased to a predetermined value, it is applied through the fuel tank passageway T13 and the main communicating passageway T15 to the second diaphragm valve 100 to open the valve 100, so that the fuel vapor is moved to the canister C. On the other hand, in the case where the internal pressure P of the fuel tank T is decreased until the difference in pressure between the fuel tank T and the canister C reaches a predetermined value, the two-way valve 70 is opened to move the fuel vapor from the canister C to the fuel tank T. As is apparent from the above description, in the fuel vapor processing device 10, the fuel cut-off valve 30, the first diaphragm valve 40, the second diaphragm valve 100, and the two-way valve 70 are coupled to the pipe body 12 so as to move the fuel vapor between the fuel tank T and the canister C.

Now, the arrangements and functions of the essential components of the fuel vapor processing device 10 will be described.

Figure 3:
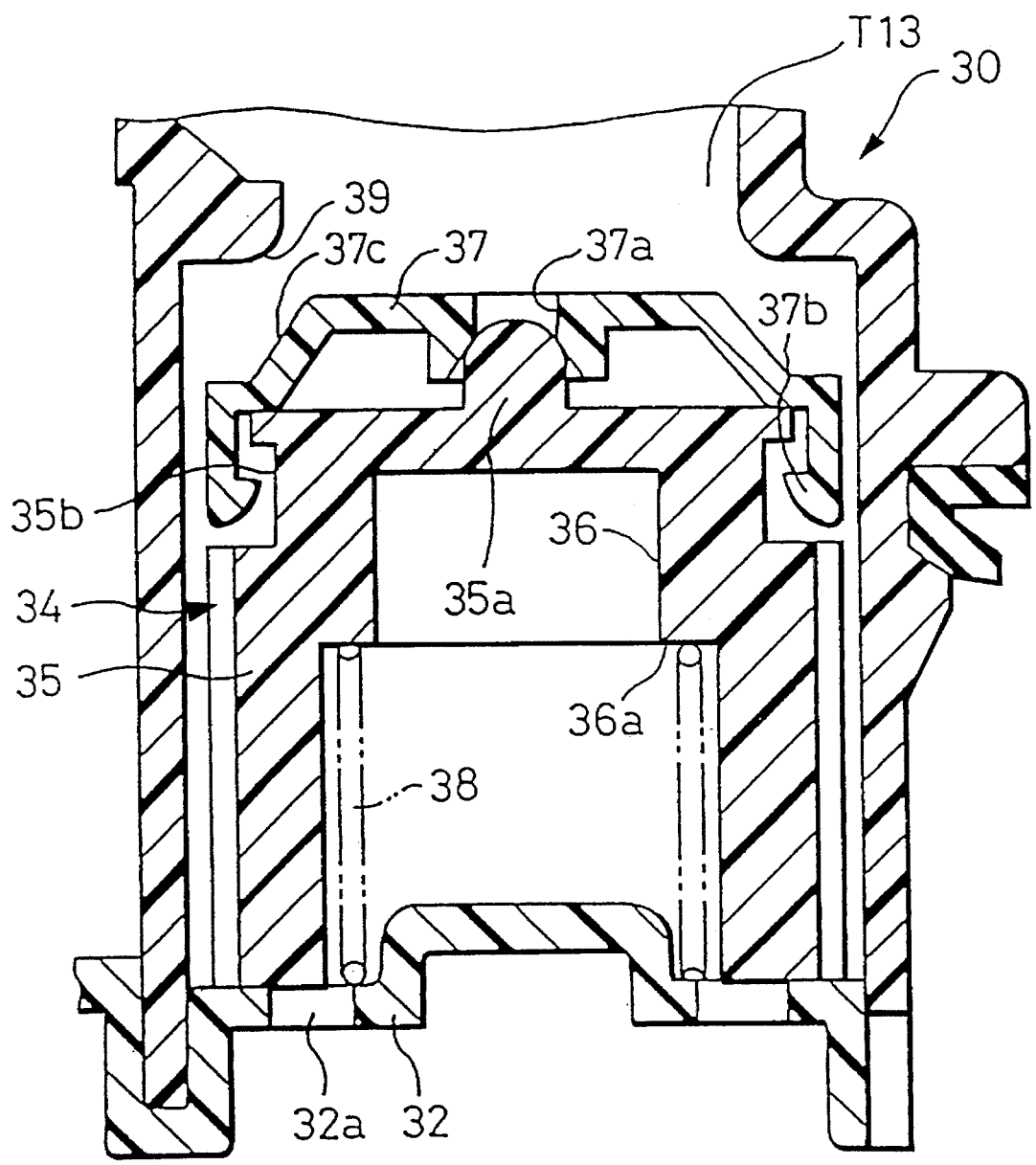
FIG. 3 is an enlarged sectional view of a fuel cut-off valve of the fuel vapor processing device, which has been opened.

The fuel cut-off valve 30 is provided for preventing the flow of liquid-phase fuel F to the canister C for instance when fuel is fed into the fuel tank T. The fuel cut-off valve 30, as shown in FIG. 3, is supported on a supporting board 32 which is provided in the fuel tank passageway T13. The supporting board 32 has communicating holes 32a. The fuel cut-off valve 30 comprises: a valve body 34; a movable valve body 37 provided over the valve body 34; and a coil spring 38. The valve body 34 includes a cylindrical member 35 from the top of which a closing protrusion 35a is extended. The cylindrical member 35 has an annular groove 35b in the outer surface of its upper portion.

The cylindrical member 35 has a bottomed hole 36 with a step 36a. The aforementioned coil spring 38 is compressed between the step 36a and the supporting board 32. The elastic force of the coil spring 38 supports only the weight of the valve body 34; that is, the valve cannot be opened by only the elastic force of the coil spring 38.

The movable valve body 37 provided over the valve body 34 as described above, has a through-hole 37a at the center thereof, which through-hole 37a is closed with the closing protrusion 35a of the valve body 34. The outer peripheral portion of the movable valve body 37 is formed into a pawl 37b which is engaged with the annular groove 35b formed in the valve body 34 so that the movable valve body 37 is slid in the valve opening or closing direction.

Figure 4:
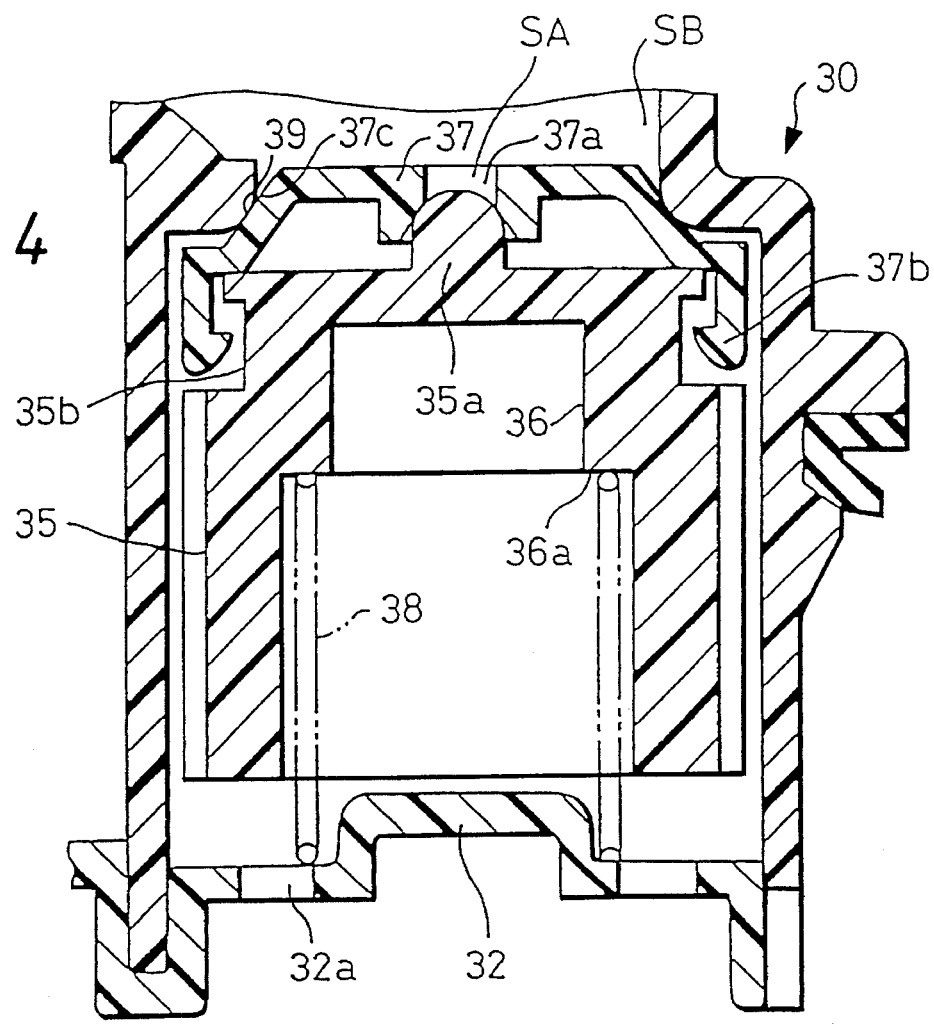
FIG. 4 is an enlarged sectional view of the fuel cut-off valve of FIG. 3 shown in a closed position.

The fuel cut-off valve 30 thus constructed operates as follows:

As fuel is fed into the fuel tank T, the fuel level FL is raised. As a result, as shown in FIG. 4 the liquid-phase fuel F pushes the valve body 34 and the movable valve body 37 upwardly through the communicating through-holes 32a formed in the supporting board 32. Hence, a seat 37c, which is a part of the movable valve body 37, is engaged with the seat 39 which is formed on the inner surface of the fuel tank pipe TC3, thus closing the fuel tank passageway T13. In this operation, the closing protrusion 35a of the valve body 34 closes the through-hole 37a of the movable valve body 37. Thus, the flow of the liquid-phase fuel F from the fuel tank T to the canister C is prevented.

Figure 5:
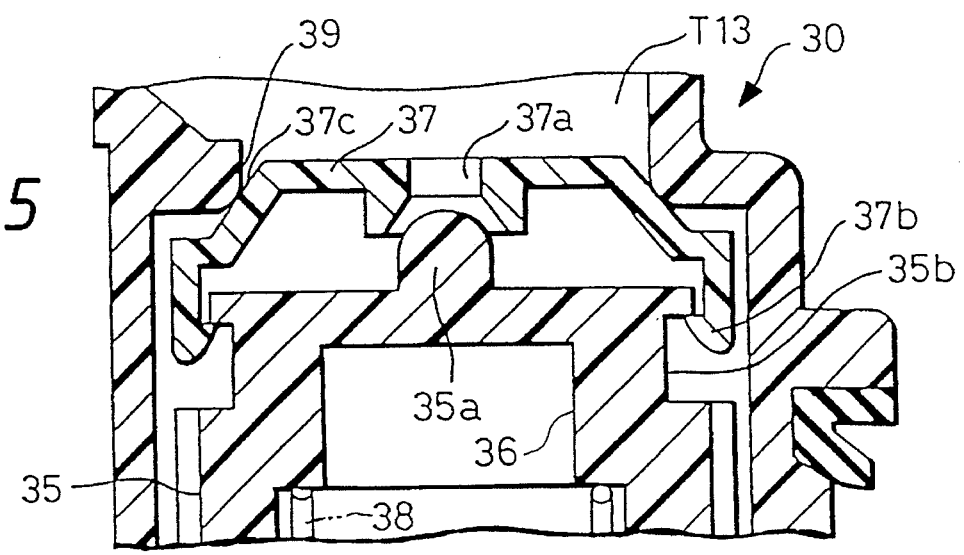
FIG. 5 is an enlarged partial sectional view showing the valve opening operation of the fuel cut-off valve.

When the fuel level FL in the fuel tank T is lowered, as shown in FIG. 5 the valve body 34 is moved downwardly to open the through-hole 37a, and thereafter, the movable valve body 37 is moved downwardly to open the valve 30. In order to move the fuel vapor from the fuel tank T to the canister C quickly, when fuel is fed into the fuel tank T, the width SA of the opening of the aforementioned seat 39 should be as large as possible; however, the fuel cut-off valve 30 has a dual-valve structure consisting of the movable valve body 37, and the valve body 34 which closes a passageway smaller than that which the movable valve body 37 closes, due to the following reason:

It is assumed that the fuel level FL has risen to cause the seat 37c of the movable valve body 37 to engage with the seat 39 formed on the inner surface of the fuel tank pipe TC3, and thereafter the fuel level FL is lowered. If, in this case, the fuel cut-off valve 30 is not opened, then, unpreferably, the internal pressure P of the fuel tank T is made abnormally high. In order to overcome this difficulty, the fuel cut-off valve 30 should be so designed that its opens immediately when the fuel level FL in the fuel tank T decreases, and it opens also when the difference in pressure between the fuel tank T and the canister passageway T16 is great. That is, with the fuel cut-off valve 30 thus designed, the internal pressure will not be raised to an abnormally high level, with the fuel tank T held closed.

Figure 6:
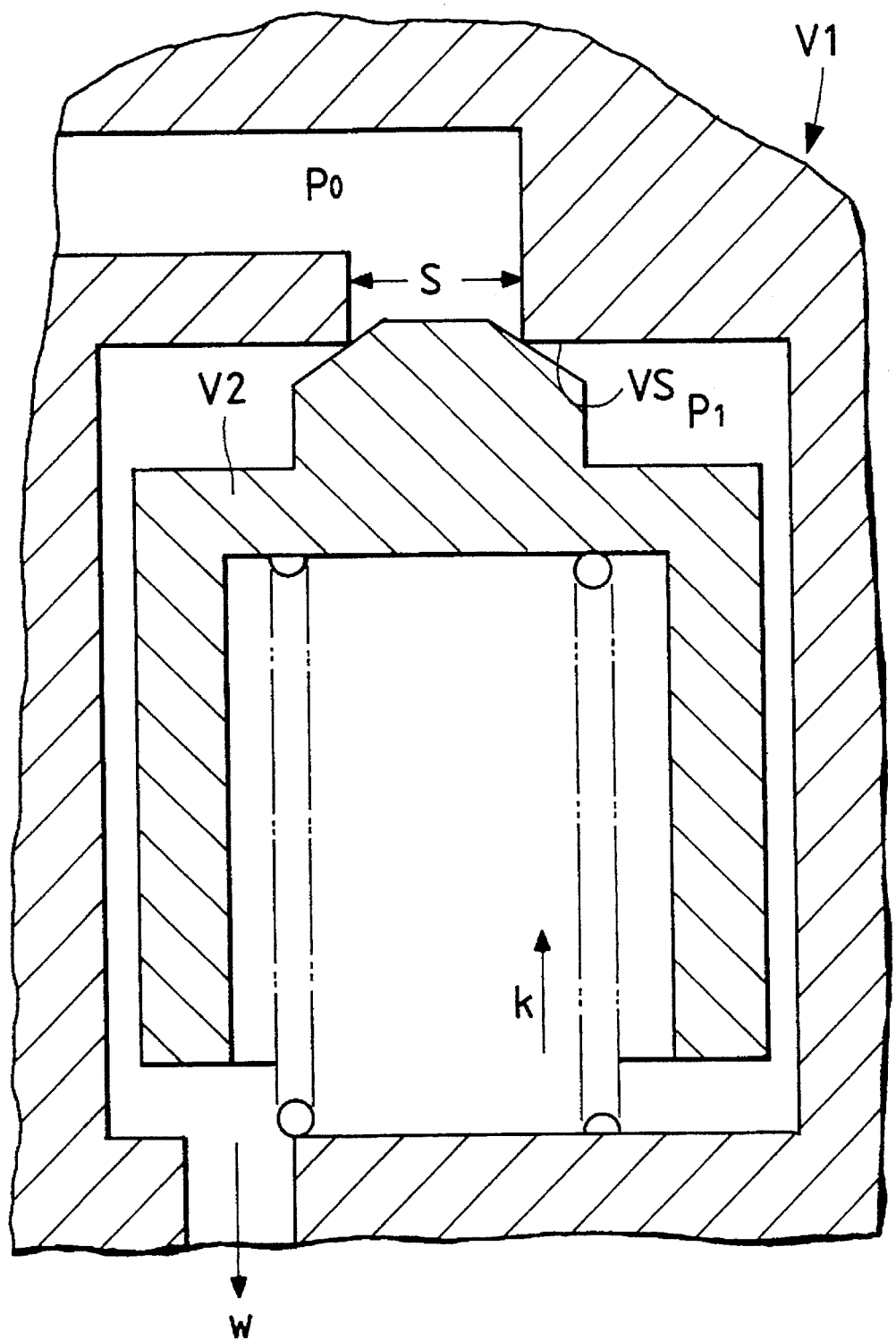
FIG. 6 is a schematic illustration of the valve closing operation of the fuel cut-off valve.

Now, with respect to a fuel cut-off valve V1 shown in FIG. 6, the conditions for opening its valve body V2 will be described.

The valve body V2 is opened when the following expression is satisfied:

$$S1 \ (P1-P0) \leqq W-K$$

where S1 is the flow path area, P1 is the tank-side pressure, P0 is the canister-side pressure, K is the spring load, and W is the valve body weight.

The right side of the expression has a positive value being the difference between the valve body weight W and the spring load K; that is, it is the force applied to the valve body V2 to open the valve body V2. If it is assumed that the force is constant, then the left side of the expression is the force which is applied to the valve body V2 to cause the valve body V2 to engage with the seat VS thereby to close the fuel cut-off valve V1. If, in this case, the flow path area S1 is small, then the valve is opened even with a large pressure difference (P1–P0); that is, in the case where the canister-side pressure P0 is constant, the valve is opened even with a great tank-side pressure P1.

Hence, even if the movable valve body 37 is fixedly engaged with the seat 39, since the passageway width SA of the-communicating through-hole 37a is smaller than width SB of the seat 39, the valve body 34 can be opened more readily than the movable valve body 37. That is, when the fuel tank T is closed, and the pressure difference becomes lower than a predetermined value, then the valve body 34 is opened earlier than the movable valve body 37, thus decreasing the internal pressure P of the fuel tank T. Hence, the internal pressure P of the fuel tank T will never be raised higher than the predetermined value.

Now, the first diaphragm valve 40 will be described with reference to FIGS. 1 and 2.

The first diaphragm valve 40 is provided in a diaphragm valve chamber 60 which is defined by a cover 41 mounted on the pipe body 12. The first diaphragm valve 40 comprises a first diaphragm valve body 50, a guide member 42 holding the body 50, and a coil spring 44. The first diaphragm valve body 50 includes; a flat-plate-shaped seat portion 52; a mounting protrusion 53 extended from the seat portion 52 so that the guide member 42 is mounted thereon; and a pressure receiving portion 54 extended radially outwardly from the seat portion 52. The outer periphery of the receiving portion 54 is held between the cover 41 and the pipe body 12, so that the diaphragm valve chamber 60 is divided into a reference pressure chamber 62 and a tank pressure chamber 64.

The reference pressure chamber 62 is connected through the fuel fill branch pipe TC2 to the fuel fill pipe T11, while the tank pressure chamber 64 is connected through the fuel tank passageway T13 and the main communicating passageway T15 to the fuel tank T. The seat portion 52 of the first diaphragm valve body 50 is so shaped as to open and close a diaphragm communicating passage or through-hole 68 which is formed in the communicating pipe TC5 for communication with the canister passageway T16.

In the first diaphragm valve 40 thus constructed, the elastic force of the coil spring 44 and the pressure transmitted through the fuel fill branch passageway T12 are applied to the first diaphragm valve body 50 so as to open the valve, while the internal pressure P of the fuel tank T is applied through the fuel tank passageway T13 so as to close the valve. Thus, the valve is opened or closed depending on the difference between those opposing forces.

When fuel is supplied into the fuel tank, the first diaphragm valve 40 operates as follows:

As fuel is fed into the fuel tank T with the fuel cap CP removed, the internal pressure P is increased. The internal pressure P thus increased is applied through the fuel tank passageway T13 to the tank pressure chamber 64. When the force of opening the first diaphragm valve body 50 exceeds the sum of the elastic force of the coil spring 44 and the pressure (atmospheric pressure) applied through the fuel fill branch pipe TC2, the first diaphragm valve body 50 is opened. When the first diaphragm valve body 50 is opened in this manner, the fuel vapor in the fuel tank T is moved through the fuel tank passageway T13, the tank pressure chamber 64, the diaphragm communicating through-hole 68 and the canister passageway T16 to the canister C, where it is recovered. The diaphragm communicating through-hole 68 of the first diaphragm valve 40 is made larger in flow-path area than the second diaphragm valve 100 so that the fuel vapor is quickly moved to the canister C when fuel is supplied into the fuel tank.

In the ordinary case; that is, in the case where the fuel fill operation is not carried out, the pressure in the fuel fill branch pipe T12 is substantially equal to the internal pressure P of the fuel tank T, and therefore the first diaphragm valve body 50 is held closed by the elastic force of the coil spring 44.

Now, the two-way valve 70 will be described with reference to FIGS. 7 and 8. The two-way valve 70 is closed as shown in FIG. 7, and it is opened as shown in FIG. 8.

Figure 7:
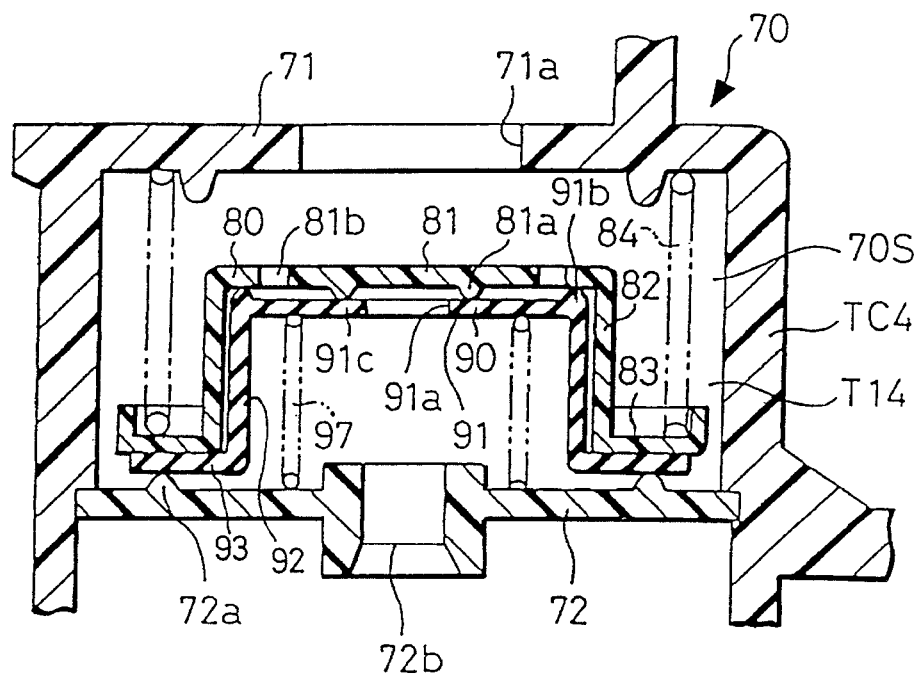
FIG. 7 is an enlarged sectional view of a two-way valve of the fuel vapor processing device which has been closed.
Figure 8:
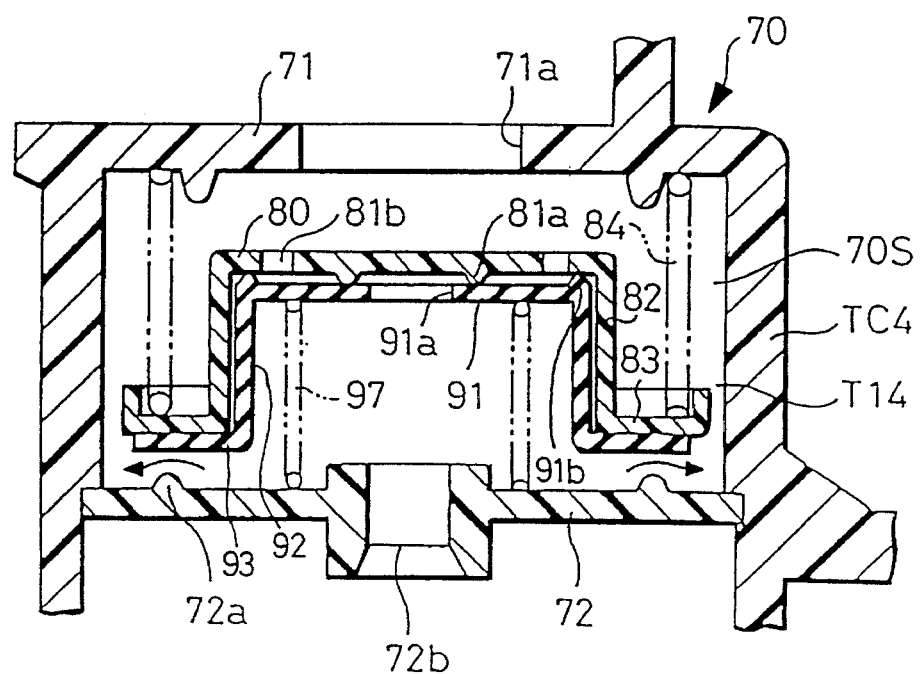
FIG. 8 is an enlarged sectional view showing the relief operation of the two-way valve of FIG. 7.

As shown in FIGS. 7 and 8, when the internal pressure P of the fuel tank T is decreased to a predetermined value, the two-way valve 70 acts as a valve to return the fuel vapor from the canister C to the fuel tank T, and as a relief valve to prevent the internal pressure P from being raised over the predetermined value. The two-way valve 70 is accommodated in the two-way passageway T14 between a valve supporting board 72 coupled to the two-way pipe TC4 and an upper partition wall 71 extended radially inwardly from the inner surface of the two-way pipe TC4. The upper partition wall 71 has a communicating through-hole 71a at the center thereof. The valve supporting board 72 also has a communicating through-hole 72b at the center thereof.

The two-way valve 70 includes a resin guide member 80. The member 80 is generally hat-shaped, including a bottom 81 with communicating through-holes 81b, a cylindrical side wall 82 extended from the periphery of the bottom 81, and a guide flange 83 extended radially outwardly from the cylindrical side wall 82. Protrusions 81a are formed on the inner surface of the bottom 81 in such a manner that they are located on a circumference. The aforementioned communicating through-holes 81b are positioned outside the circumference on which the protrusions 81a are located. An upper coil spring 84 is set compressed between the resin guide member 80 and the upper partition wall 71.

A rubber valve body 90, which is substantially similar to the resin guide member 80, is provided inside the member 80. The rubber valve body 90 includes a bottom, namely, a disk-shaped seat portion 91, and a cylindrical side wall portion 92 extended from the periphery of the seat portion 91, and a flange-shaped seat portion 93 extended from the cylindrical side wall portion 92. The disk-shaped seat portion 91 has a through-hole 91a at the center thereof. An annular protrusion 91b is formed on the disk-shaped seat portion 91 so that the resin guide member 80 is mounted on it. The seat portion 91 is made small in thickness so that it is bendable. A lower coil spring 97 is set compressed between the disk-shaped seat portion 91 and the valve supporting board 71. The flange-shaped seat portion 93 is seated on an annular protrusion 72a formed on the inner surface of the valve supporting board 72.

Figure 9:
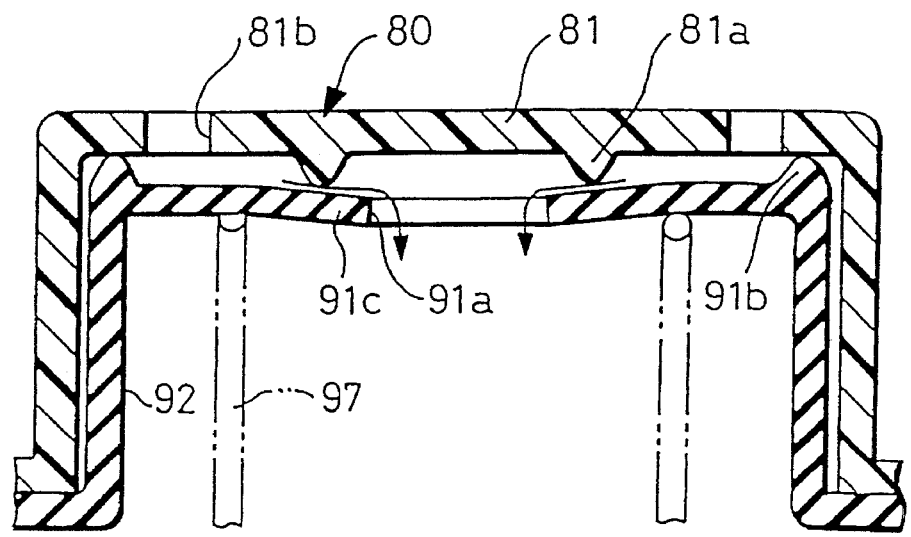
FIG. 9 is an enlarged sectional view of a portion of the two-way valve of FIG. 7 showing the valve opening operation thereof.

The two-way valve 70 thus constructed operates as follows:

When the internal pressure P of the fuel tank T decreases until the pressure in the canister C is higher than the internal pressure P as much as a predetermined value, the pressure of the fuel vapor in the canister passageway T16 is applied through the through-holes 81b of the resin guide member 80 to the rubber valve body 90. When the pressure applied to the rubber valve body 90 exceeds the valve closing power derived, for instance, from the elastic force of the lower coil spring 97, then as shown in FIG. 9 the inner periphery 91c of the disk-shaped seal portion 91 which defines the through-hole 91a is bent downwardly by the pressure as shown in FIG. 9, so that the lower coil spring 97 is pushed downwardly to the position where the upward and downward powers are balanced with each other, to open the valve 70.

As a result, the fuel vapor flows from the canister C through the canister passageway T16, the through-holes 81b of the resin guide member 80, the two-way valve chamber 70S, and the communicating through-hole 72b of the valve supporting board 72 into the fuel tank T. As is apparent from the above description, when the internal pressure P of the fuel tank T is decreased as much as the predetermined value, the two-way valve 70 is opened, to return the fuel vapor from the canister C into the fuel tank T.

When the fuel tank T is sealingly closed, the two-way valve 70 operates as a relief valve as follows:

When the fuel tank T is held sealingly closed, its internal pressure P is increased. When the pressure applied to the rubber valve body 90 exceeds the valve closing power derived, for instance, from the elastic force of the upper coil spring 84, the rubber valve body 90 and the resin guide member 80 are opened against the elastic force of the upper coil spring 84 as shown in FIG. 8; that is, the flange-shaped seat portion 93 is disengaged from the annular protrusion 7. As a result, the fuel vapor flows from the fuel tank T through the gap formed between the seat portion 93 of the rubber valve body 90 and the annular protrusion 72a and through the canister passageway T16 into the canister C.

Now, the second diaphragm valve 100 will be described.

Figure 10:
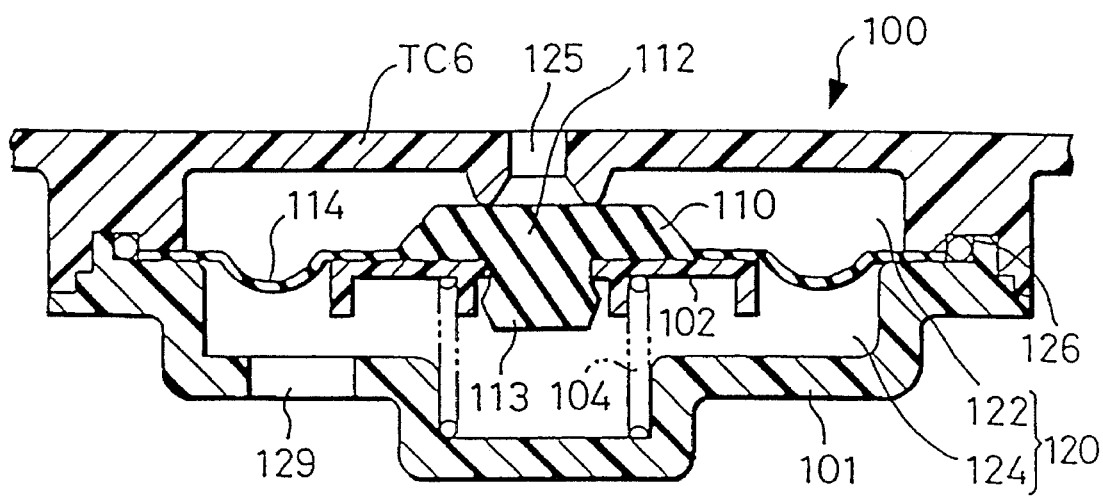
FIG. 10 is an enlarged sectional view of a second diaphragm valve of the invention.
Figure 11:
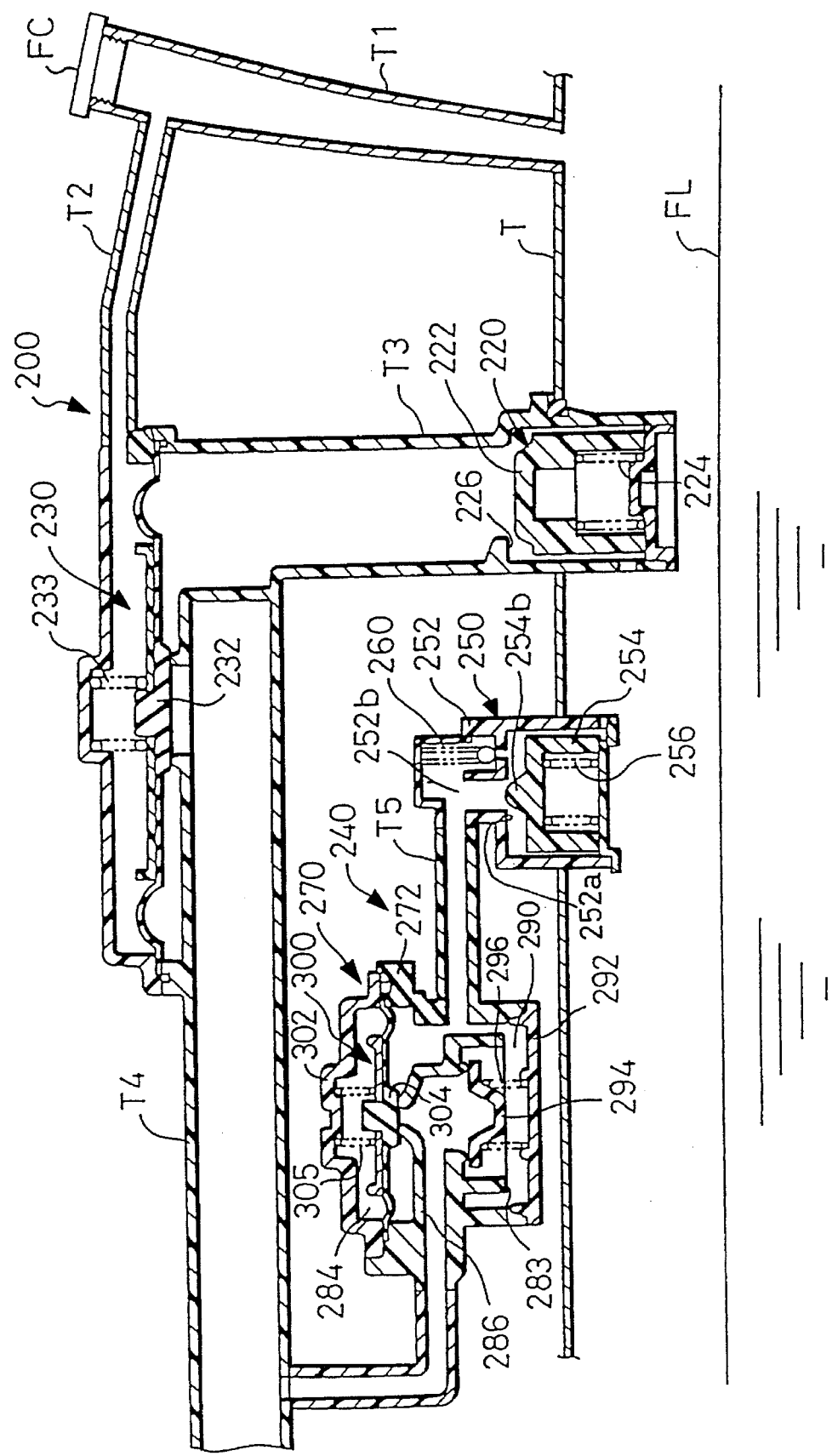
FIG. 11 is a sectional view showing the arrangement of a conventional fuel vapor processing device mounted in a fuel tank of a vehicle.

The second diaphragm valve 100 operates as follows: When the internal pressure P of the fuel tank T is increased to a predetermined value, the second diaphragm valve 100 is opened to cause the fuel vapor to flow from the fuel tank T to the canister C. As shown in FIG. 10, the second diaphragm valve 100 is provided in a diaphragm valve chamber 120 in the casing body 101, and comprises a second diaphragm valve body 110, a guide member 102 holding the second diaphragm valve body 110, and a coil spring 104. The second diaphragm valve body 110 includes a flat-plate-shaped seat portion 112, a mounting protrusion 113 extended from the seat portion 112 so that the guide member 102 is mounted on it, and a pressure receiving portion 114 extended radially outwardly from the seat portion 112. The outer periphery of the pressure receiving portion 114 is held between the casing body 101 and a mounting step 126 formed on the inner surface of the canister pipe TC6, so that the diaphragm valve chamber 120 is divided into a tank pressure chamber 122 and a reference atmospheric pressure chamber 124.

The tank pressure chamber 122 is connected through the main communicating passageway T15 and the fuel tank passageway T13 to the fuel tank T, while the reference atmospheric pressure chamber 124 is communicated with the outside through an outside air passageway 129. The seat portion 112 of the second diaphragm valve body 110 is so shaped as to open and close a communicating passage or through-hole 125 formed in the canister pipe TC6.

In the second diaphragm valve 100 thus constructed, the internal pressure P of the fuel tank T is applied through the main communicating passageway T15 to the second diaphragm valve body 110 to open the valve 100, while the elastic force of the coil spring 104 and the atmospheric pressure given through the outside air passageway 129 are applied to the second diaphragm valve body 110 to close the valve 100. Hence, the valve is opened or closed depending on the difference between those opposing forces.

Hence, in the second diaphragm valve 100, when the internal pressure P of the fuel tank T becomes higher than the atmospheric pressure by a predetermined value, it is applied through the fuel tank passageway T13 and the main communicating passageway T15 to the tank pressure chamber 122 to increase the pressure in the chamber 122. As a result, the second diaphragm valve body 110 is pushed downwardly against the elastic force of the coil spring 104 and the atmospheric pressure to the position where the upward and downward powers are balanced with each other.

As a result, the fuel vapor which raises the internal pressure of the fuel tank T is caused to flow through the fuel tank passageway T13, the main communicating passageway T15, the tank pressure chamber 122, the communicating through-hole 125 and the canister passageway T16 into the canister C. That is, when the internal pressure P of the fuel tank T becomes higher than the atmospheric pressure, as much as the predetermined value the second diaphragm valve 100 is opened to move the fuel vapor from the fuel tank T into the canister C.

In the above-described embodiment, the diaphragm communicating through-hole 68 which is opened and closed by the first diaphragm valve body 50 of the first diaphragm valve 40, and the communicating through-hole 125 which is opened and closed by the second diaphragm valve body 110 of the second diaphragm valve 100 are formed in one piping system including the main communicating passageway T15 and the canister passageway T16. Hence, when the internal pressure of the fuel tank T becomes higher than the atmospheric pressure as much as the predetermined value while fuel is being fed into the fuel tank T, the fuel vapor is moved to the canister C.

Thus, the fuel vapor processing device of the invention is free from the difficulty accompanying the conventional device wherein the pipe line for transferring the fuel vapor to the canister C when fuel is fed into the fuel tank, and the pipe line for maintaining the internal pressure P of the fuel tank T at the predetermined value or less are provided separately. Hence, the fuel vapor processing device of the invention, when compared with the conventional device, is simple in construction and can be installed in a small space. In addition, since only one passageway is extended from the fuel tank T to the canister C, the liquid-phase fuel between the fuel tank and the canister may be controlled with only one fuel cut-off valve 30. This means that the fuel vapor processing device can be simplified further.

In the fuel vapor processing device of the invention, the first communicating hole, which is opened and closed by the first valve body of the first diaphragm valve, and the second communicating hole, which is opened and closed by the second valve body of the second diaphragm valve, are formed in one piping system including the fuel-tank-side pipe and the canister-side pipe. This simplified arrangement makes it possible to move the fuel vapor in the fuel tank to the canister both in the case where fuel is supplied into the fuel tank and in the case where the pressure in the fuel tank becomes higher than the atmospheric pressure, as much as the predetermined value.

While there has been described in connection with the preferred embodiment of this invention, it will be appreciated that various changes and modifications may be made therein without departing from the invention, and it is aimed, therefore, to cover in the appended claims all such changes and modifications as fall within the true spirit and scope of the invention.

What is claimed is:

1. A fuel vapor processing device for transferring fuel vapor from a fuel tank to a canister when a liquid-phase fuel is fed into the fuel tank through a fuel fill pipe or when the pressure in said fuel tank is raised to a predetermined value, said fuel vapor processing device comprising:

a fuel-tank-side pipe line constructed and arranged to be connected to said fuel tank;

a canister-side pipe line constructed and arranged to be connected to said canister;

a first communicating passage provided between said fuel-tank-side pipe line and said canister-side pipe line;

a first diaphragm valve including a first valve body having one side constructed and arranged to receive pressure in said fuel fill pipe, and another side constructed and arranged to receive pressure in said fuel-tank-side pipe, said first valve body opening and closing said first communicating passage in response to the pressure applied thereto;

a second communicating passage provided between said fuel-tank-side pipe line and said canister-side pipe line; and a second diaphragm valve including a second valve body having one side constructed and arranged to receive atmospheric pressure, and another side constructed and arranged to receive pressure in said fuel-tank-side pipe line, said second valve body opening and closing said second communicating passage in response to the pressure applied thereto.

2. A fuel vapor processing device as claimed in claim 1, further comprising:

a fuel cut-off valve constructed and arranged to prevent liquid-phase fuel from flowing into said canister; and a two-way valve constructed and arranged to return fuel vapor from the canister to the fuel tank when a pressure in the fuel tank is decreased to a predetermined value, and to limit the pressure in the fuel tank.

3. A fuel vapor processing device as claimed in claim 2, wherein said fuel cut-off valve comprises:

a valve body including a cylindrical member, a closing protrusion extending from a top of the cylindrical member, and an annular groove formed in an outer surface of an upper portion of the cylindrical member;

a movable valve body having a through-hole which is closable with the closing protrusion, and a pawl which is engageable with the annular groove at an outer peripheral portion of the movable valve body; and a coil spring for supporting only weight of the valve body.

4. A fuel vapor processing device as claimed in claim 1, wherein said first diaphragm valve further includes a guide member constructed and arranged to hold said first diaphragm valve body, and a coil spring constructed and arranged to urge said first diaphragm valve body toward said first communicating hole.

5. A fuel vapor processing device as claimed in claim 4, wherein said first diaphragm valve body includes a flat-plate-shaped seat portion, a mounting protrusion extended from the seat portion to mount said guide member, and a pressure receiving portion extending radially outwardly from the seat portion.

6. A fuel vapor processing device as claimed in claim 2, said two-way valve includes:

a resin guide member including a bottom having communicating through-holes and protrusions at inner surface thereof, a cylindrical side wall extending from the periphery of the bottom, and a guide flange extending radially outwardly from the cylindrical side wall, and a rubber valve body including a seat portion which has a through-hole at a center thereof and protrusions formed thereon, a cylindrical side wall portion extending from the periphery of the seat portion and a flange seat portion.

7. A fuel vapor processing device as claimed in claim 1, wherein said second diaphragm valve further includes a guide member constructed and arranged to hold the second diaphragm valve body, and a coil spring constructed and arranged to urge said second diaphragm valve body toward said second communicating passage.

8. A fuel vapor processing device as claimed in claim 7, wherein said second diaphragm valve body includes a flat-plate-shaped seat portion, a mounting protrusion extending from the seat portion to mount the guide member, and a pressure receiving portion extending radially outwardly from the seat portion.

* * * * *